United States Patent [19]

Wilson et al.

[11] 4,402,847
[45] Sep. 6, 1983

[54] HIGH LEAD SOLDER CORROSION INHIBITORS

[75] Inventors: Joe C. Wilson, Woodhaven; Stanley T. Hirozawa, Birmingham, both of Mich.

[73] Assignee: BASF Wyandotte Corporation, Wyandotte, Mich.

[21] Appl. No.: 379,641

[22] Filed: May 19, 1982

[51] Int. Cl.³ ............... C09K 5/00; C23F 11/10; C23F 11/12; C23F 11/14
[52] U.S. Cl. ............... 252/75; 62/DIG. 20; 106/14.12; 106/14.15; 106/14.16; 106/14.44; 106/14.45; 252/68; 252/76; 252/78.3; 252/181; 252/389 R; 252/389 A; 422/13; 422/16; 422/18
[58] Field of Search ........... 252/389 R, 389 A, 68, 252/73, 75, 76, 78.3, 181; 106/14.12, 14.15, 14.16, 14.44, 14.45; 422/13, 16, 18; 62/DIG. 20, 83

[56] References Cited

U.S. PATENT DOCUMENTS

| | | | |
|---|---|---|---|
| 3,341,469 | 9/1967 | Pines et al. | 252/389 R |
| 3,672,821 | 9/1972 | Schlussler | 422/13 |
| 4,210,548 | 7/1980 | Hirozawa et al. | 252/389 R |
| 4,234,440 | 11/1980 | Hirozawa et al. | 252/389 R |
| 4,241,016 | 12/1980 | Hirozawa et al. | 252/73 |
| 4,354,002 | 12/1982 | Davis et al. | 252/389 R |
| 4,362,644 | 12/1982 | Davis et al. | 252/389 R |

Primary Examiner—Irwin Gluck
Attorney, Agent, or Firm—David L. Hedden; Joseph D. Michaels

[57] ABSTRACT

Compositions and method of using said compositions for inhibiting mineral scale and the corrosion of high lead solder and the cavitation-erosion corrosion of aluminum in aqueous systems are disclosed. Unexpectedly, a mixture of a siloxane-silicate copolymer with an azole is effective in reducing the corrosion of high lead solder and aluminum, particularly the cavitation-erosion corrosion of aluminum in contact with aqueous liquids, such as aqueous alcohol solutions used as heat transfer media. Antifreeze concentrates and a process for inhibiting corrosion are also disclosed.

17 Claims, No Drawings

HIGH LEAD SOLDER CORROSION INHIBITORS

BACKGROUND OF THE INVENTION

1. Field of the Invention

The invention relates to corrosion-inhibited aqueous solutions, particularly antifreeze compositions useful as coolants in a heat-exchange system such as the cooling system of an internal combustion engine.

2. Prior Art

Peeler et al in U.S. Pat. No. 3,576,746 disclose that tetramethylsilane or a fluorine substituted tetramethylsilane can be used in functional fluid compositions to decrease cavitation-erosion corrosion. Useful functional fluid base materials include organic materials such as polyphenyl ethers, hydrocarbon oils, such as natural mineral oil and synthetic oil including alkylated hydrocarbons and mixtures thereof. The cavitation-erosion corrosion tests shown utilize copper specimens in the evaluation of the functional fluids.

Pines et al in U.S. Pat. Nos. 3,337,496 and 3,341,469 disclose siloxane-silicate copolymers including methyl siloxane as a component of said copolymer for use as metal corrosion inhibitors in aqueous alcohol compositions.

SUMMARY OF THE INVENTION

A novel synergistic mixture of a siloxane-silicate copolymer and an azole reduces mineral scale and the corrosion of high lead solder and the cavitation-erosion corrosion of aluminum exposed to aqueous liquids. The siloxane-silicate copolymer corrosion inhibitors can be prepared in situ at ambient temperature and pressure by providing to an aqueous alcohol solution appropriate amounts of a conventional water-soluble silicate and a siloxane or precursor thereof further described below.

DETAILED DESCRIPTION OF THE INVENTION

The siloxane-silicate copolymers useful as corrosion inhibitors of the invention can be prepared in situ by reacting a siloxane as hereinafter described with a water-soluble silicate under ambient or elevated conditions of temperature and ambient pressure in an aqueous medium. Preferably the reaction is conducted in the presence of a water-soluble alcohol comprising ethylene glycol which is utilized in the preparation of a heat transfer medium for the cooling system of an internal combustion engine.

The siloxane useful in the preparation of the siloxane-silicate copolymer used as a corrosion inhibitor in admixture with an azole is a siloxane having the formula $$RSiO_{1.5} \quad (I)$$

wherein R is an monovalent aliphatic hydrocarbon having 1 to about 18 carbon atoms, or a phenyl or vinyl group. These siloxanes are disclosed in U.S. Pat. Nos. 3,337,496 and 3,341,469, incorporated herein by reference.

The water-soluble silicates which are useful in the preparation of the siloxane-silicate copolymers of the invention can be represented by the average formula:

$$\left[\frac{M}{d} O\right]_e SiO_{\frac{4-e}{2}} \quad (II)$$

wherein M is a cation that forms a water-soluble silicate such as an alkali metal, ammonium or tetraorganoammonium cation (silicic acid, where M is hydrogen, can also be used), d is the valence of M and is at least 1 and e has a value of 1 to 3, or preferably 1.0 to 2.5.

The siloxane-silicate copolymers of the invention contain about 0.1 to about 99.9 parts by weight of at least one of said silicate group member derived from said water-soluble silicate and from 0.1 to 99.9 parts by weight of at least one of said siloxane group, all based upon 100 parts by weight of said copolymer. Preferably, the copolymers of the invention contain about 5 to about 45 parts by weight of said siloxane groups and about 55 to about 95 parts by weight of said silicate groups and, most preferably, about 15 to about 25 parts by weight of said siloxane groups and about 75 parts to about 85 parts by weight of said silicate groups, all based upon 100 parts by weight of said copolymer.

Illustrative of these water-soluble silicates are the alkali metal silicates such as the alkali metal orthosilicates, the alkali metal metasilicates, the alkali metal tetrasilicates, the alkali metal disilicates, and the tetraorgano ammonium silicates. Specific examples of these silicates are potassium metasilicate, sodium orthosilicate, sodium disilicate, lithium orthosilicate, lithium metasilicate, lithium disilicate, rubidium disilicate, rubidium tetrasilicate, mixed alkali metal silicates, tetra(methyl)ammonium silicate, tetra(ethyl)ammonium silicate, phenyltrimethylammonium silicate, benzyltrimethylammonium silicate, guanidine silicate, and tetra(hydroxy-ethyl)ammonium silicate. The preferred silicates are sodium and potassium silicates, especially sodium metasilicate and potassium metasilicate.

In preparing the copolymers of the invention, the starting silicate can be added to the reaction mixture as such or it can be formed in situ by adding the appropriate hydroxide, for instance, sodium or potassium hydroxide, and silica to the reaction mixture. The temperature at which the siloxane and silicate which is formed in situ, are maintained in the reaction mixture to produce the copolymers of this invention can vary widely. Temperatures from 20° C. to 150° C. at ambient pressures can be used. However, temperatures from 20° C. to 115° C. are preferred. The use of other temperatures or pressures is generally undesirable since no advantage is gained thereby. Reaction times can be between about 2 to about 8 hours.

The formation of the copolymers of this invention provide a means of stabilizing the gel-forming tendencies of water-soluble silicates in aqueous liquids, for instance, alcohol solutions such as solutions of ethylene glycol utilized in the preparation of antifreeze compositions. The siloxane-silicate copolymer does not gel after extended heating at 180° F. in an aqueous solution such as an aqueous solution containing an alcohol, for instance, ethylene glycol (an antifreeze coolant or antifreeze concentrate) as is the case with a water-soluble, metal salt silicate. As a consequence of the retention of the water-solubility properties of the copolymer of the invention, aqueous alcohol solutions containing the copolymers of the invention cause remarkably less corrosion than water-soluble, metal salt silicate inhibited aqueous alcohol solutions which makes the former admirably suited as non-corrosive coolants for use in the cooling system of internal combustion engines.

Alternatively, the copolymers of this invention can be used as corrosion inhibitors by adding the previously formed copolymer to an aqueous liquid and uniformly dispersing the copolymer throughout the liquid. Any suitable means can be used to disperse the copolymer throughout the liquid. Thus, in the case of moving liquids that are in contact with the metal to be protected, the copolymer can be added to the liquid while the liquid is in use and dispersion of the copolymer throughout the liquid can be achieved by the movement of the liquid. However, the copolymer can be added to the liquid prior to the use of the liquid in contact with the metal to be protected and the copolymer can be dispersed throughout the liquid by stirring the liquid. This latter procedure is preferred where the liquid is to be stored or where the liquid undergoes little movement when in use such as in the case of antifreeze concentrates.

When the silane precursors of the siloxane are added to an aqueous liquid together with a water-soluble silicate to produce the siloxane and the copolymer in situ, the precursor silane is converted to the siloxane by hydrolysis when mixed with water even at ambient temperature. The silane precursors to the siloxane can contain alkoxy groups attached to the silicon atom, for instance, methoxy, ethoxy, propoxy, or butoxy groups. The reaction of the silane and water-soluble metal salt silicate is catalyzed by the presence of said water-soluble silicate. The siloxane so formed then reacts with said water-soluble silicate. Should it be desired to isolate the copolymer, distillation of the aqueous medium or aqueous alcohol medium can be used to recover the copolymer. Representative useful siloxanes are methyl siloxane, ethyl siloxane, and phenyl siloxane.

The copolymers of this invention are generally useful in an effective metal corrosion inhibiting amount for the protection of many metals that come into contact with an aqueous liquid. The amount of the copolymers of this invention used in inhibiting corrosion of metals in contact with aqueous liquids is dependent upon the temperature, type of metal or metals being protected, type of any organic liquid in the solution, pH of the aqueous liquid, velocity of the aqueous liquid, the presence of inorganic solutes (e.g. electrolytes such as chlorides, sulfates and bicarbonates) in the aqueous liquid, and prior corrosion treatment or corrosion state of the metal. Generally, about 0.125 part to about 4 parts by weight, preferably about 0.25 part to about 1.25 parts by weight, and most preferably about 0.75 part to about 1.0 part by weight of said copolymer is used, all based upon 100 parts by weight of inhibited aqueous liquid such as an antifreeze concentrate or coolant composition.

Suitable aqueous liquids are pure water, aqueous solutions containing inorganic solutes and solutions containing water and water-soluble organic compounds, especially a water-soluble or a water-miscible organic liquid such as alcohols and specifically glycols. Illustrative of suitable aqueous solutions containing inorganic solutes are aqueous sodium or potassium chloride refrigerating solutions, corrosive well water or river water containing chlorides, carbonates and sulfates which may be used as process or cooling water in industry, and the like. Illustrative of suitable aqueous solutions are those containing water and a water-soluble alcohol, preferably having 1 to 4 carbon atoms and 1 to 3 hydroxy groups, such as a monohydric or polyhydric alcohol (e.g., methanol, ethanol, propanol, and glycols such as ethylene glycol, propylene glycol and glycerol), hydroxyl and alkoxy end-blocked polyalkylene oxides (such as hydroxyl and end-blocked polyethylene oxide), sulfoxides (such as methylsulfoxide), formamides (such as dimethylformamide) or cyclic ethers free of olefinic unsaturation (such as tetrahydrofuran, dioxane and the like). Preferably ethylene glycol is used. Suitable solution concentrates, i.e., antifreeze concentrates, containing water and a water-soluble organic liquid should contain at least about 1.0 to about 10 parts by weight of water per 100 parts by weight of the total of the water and the organic liquid.

The copolymers of this invention are generally useful in the protection of many metals and alloys that are used in industrial processes and apparatus especially aluminum, steel, copper, and brass. Metals whose corrosion is retarded by the copolymers of this invention include the metals below sodium in the electromotive series (e.g. magnesium, aluminum, copper, iron, manganese, nickel, lead, silver, tin, beryllium and zinc) as well as the alloys of such metals (e.g. brass, bronze, solder alloys, steel and the like). Such metals normally become corroded when in prolonged contact with water, particularly when the water is at elevated temperatures and/or contains electrolytes (e.g. acidic solutes). The copolymers of this invention are particularly useful in the protection of high-lead solder and the cavitation-erosion corrosion of aluminum.

Compared with known inhibitors used in preventing corrosion of metals that are in contact with water, the copolymers of this invention provide numerous advantages. Thus, the copolymers can be added to a wide variety of aqueous solutions and inhibit the corrosion of a wide variety of metals. In addition, the copolymers are effective over a wide temperature range and these inhibitors do not cause the liquids in which they are employed to foam excessively. Furthermore, these copolymers do not promote the decomposition of any organic liquids present in the liquid nor do they attack other organic materials with which the liquid may come in contact.

The copolymers of this invention are useful in preventing the corrosion of metals that are cleaned by corrosive solutions or that are used in cooling coils, boilers, refrigeration and air conditioning equipment, heat exchange tubes, storage tanks for liquids, pipes, solvent containers, tank cars, ballast tanks containing sea water and the like. The copolymers of this invention are particularly useful for inhibiting the corrosion of metals present in the cooling systems of internal combustion engines which are in contact with aqueous alcohol coolant compositions.

The corrosion of high-lead solder exposed to aqueous liquids is unexpectedly reduced when the siloxane-silicate copolymers of the invention are present in a corrosion inhibiting amount in admixture with an azole. High-lead solder is an alloy containing about 96.5 percent by weight lead, about 3 percent by weight tin, and about 0.5 percent by weight silver. It is more difficult to protect against corrosion in contact with aqueous liquids than the ordinary (low-lead) solders and the usual range of metals commonly found in the cooling system of a water-cooled internal combustion engine. In addition, an unexpected improvement in the cavitation erosion of aluminum, i.e., aluminum water pumps exposed to aqueous liquids, is obtained when the synergistic mixture of the siloxane-silicate copolymer and an azole are present in metal corrosion inhibiting amounts in said aqueous liquid.

Inhibited alcohol compositions, such as antifreeze concentrates, containing an alcohol and a copolymer of this invention as a corrosion inhibitor are remarkably useful as antifreezes and coolants for the cooling systems of internal combustion engines. The antifreeze concentrates are inhibited alcohol solutions containing relatively small amounts of water and the coolants are inhibited alcohol solutions containing relatively large amounts of water. The antifreeze concentrates are adapted to economical shipment and storage and the coolants are adapted to use as heat transfer media in the cooling systems of internal combustion engines. In practice, the concentrate can be shipped to the point where it is to be added to the cooling system and there it can be diluted to form a coolant.

Water imparts desirable properties to both the concentrate and coolant compositions (e.g. small amounts of water serve to increase the solubility of the inhibitor components of the concentrate compositions and large amounts of water impart good heat transfer properties to the coolant compositions). These compositions generally contain about 1 part by weight to about 900 parts by weight of water per 100 parts by weight of the antifreeze concentrate. It is preferable that the coolant compositions contain about 30 to about 900 parts by weight of water per 100 parts by weight of the antifreeze concentrate. Generally, the concentrates contain about 1.0 part to about 10 parts by weight (or preferably about 2 parts to 7 parts by weight) of water per 100 parts by weight of the antifreeze concentrate. The relative amount of water and alcohol in these compositions can be varied to lower the freezing point of the compositions by the desired amount. Preferably about 85 to about 97 percent by weight of the antifreeze concentrate is ethylene glycol and up to about 10 percent by weight of the total weight of said concentrate is diethylene glycol. Most preferably, about 90 percent to about 95 percent by weight is ethylene glycol and about 2 percent to about 7 percent by weight is diethylene glycol, all based upon the total weight of said concentrate.

The pH of the inhibited aqueous alcohol compositions of this invention should be greater than seven to minimize corrosion of metals with which the compositions come in contact. Generally, the pH of the antifreeze concentrate or coolant composition is in the range of about 7 to about 11, preferably about 8 to about 11 and most preferably about 9.0 to about 10. The pH is maintained within the above pH ranges by the addition of conventional pH buffers such as salts of strong bases and weak acids, as are disclosed in U.S. Pat. No. 3,121,692, incorporated herein by reference.

If desired, various additives can be added to the above-described inhibited alcohol compositions in particular instances for imparting special properties. By way of illustration, anti-foam agents, identifying dyes, pH indicators, conventional corrosion inhibitors, sealants which prevent leakage of the coolant from the cooling system, anti-creep agents which prevent seepage of the coolant into the crankcase, and the like can be added to these compositions.

The azole compound which is required in conjunction with the siloxane-silicate copolymer in the aqueous systems of the invention is selected from among the water-soluble metal salt mercaptobenzothiazoles, tolyltriazoles, triazoles, pyrazoles, imidazoles, isooxazoles, isothiazoles, thiazoles, thiadiazoles, and the like. Generally, the alkali metal salts are used as the water-soluble form of said azoles. Specific preferred azole compounds include 1,2,3-benzotriazole, sodium salt; 1,2,3-tolyltriazole, sodium salt; sodium mercaptobenzothiazole; and sodium mercaptobenzimidazole. Generally, the azole compound is used in amounts of about 0.05 part to about 0.5 part by weight, preferably about 0.1 part to about 0.4 part by weight, all based upon 100 parts by weight of said aqueous liquid.

Conventional corrosion inhibitors and/or alkaline pH buffers which can be used under aqueous alkaline conditions in combination with the copolymer corrosion inhibitors of the invention include water-soluble metal salts such as the alkali metal carbonates, borax, the alkali metal dichromates, the alkali metal phosphates, the alkali metal benzoates and hydroxybenzoates, the alkali metal tungstates, the alkali metal salts of toluic acid, the alkali metal salts of phenol, lower alkanolamines ($C_2$–$C_6$), for instance, triethanolamine, alkali metal nitrates, alkali metal nitrites, and alkali metal molybdates. Generally, such conventional corrosion inhibitors and alkaline pH buffers are used under alkaline conditions in an amount effective to inhibit corrosion. Generally, conventional corrosion inhibitors are used in the amount of about 0.03 part to about 5 parts by weight, preferably about 0.1 to about 2 parts by weight per 100 parts total weight of the antifreeze concentrate.

Useful antifoam agents are the alkoxylated nonionic surfactants which exhibit low-foaming characteristics. Examples of alkoxylated nonionic synthetic detergents which can be advantageously employed as antifreeze compositions of the invention include polyoxyalkylene adducts of hydrophobic bases, as illustrated by PLURONIC® L-61. Typical hydrophobic bases which can be condensed with alkylene oxides are the mono- and polyalkylphenols and the compounds prepared by condensing polyoxypropylene with an initiator having about 1 to 6 carbon atoms and at least one reactive hydrogen atom. Additional useful defoamers based upon nonionic surfactants are disclosed in U.S. Pat. No. 3,931,029, incorporated herein by reference. Useful water-pump lubricants are known in the prior art. The above-described additives can be incorporated in any convenient manner, e.g., by adding to a mixture of an alcohol, the siloxane-silicate copolymer inhibitor, and water in a container and stirring the additives into the mixture.

Test Methods

In evaluating the cavitation-erosion corrosion performance of aluminum water pumps in the presence of engine coolants containing corrosion inhibitors, ASTM D 2966 Standard Test Method was utilized and is incorporated herein by reference. In the evaluation of metal corrosion including high-lead solder in contact with engine coolants containing corrosion inhibitors, ASTM D 1384 glassware corrosion test modified by the substitution of solder alloy 2004 for solder alloy 2006 was utilized. The latter test method is incorporated herein by reference.

The following example illustrates the various aspects of the invention but is not intended to limit its scope. Where not otherwise specified throughout this specification and claims, temperatures are given in degrees centigrade and parts, percentages, and proportions are by weight.

EXAMPLES 1 AND 2

(Example 1 is a control example forming no part of this invention)

Antifreeze concentrates were prepared containing the proportions of ingredients indicated in Table I below.

The antifreeze concentrates are prepared by first dissolving in a water-ethylene glycol mixture or mixture of water, ethylene glycol, and diethylene glycol, a water-soluble silicate and methyltriethoxysilicate together with the remaining corrosion inhibitors in the proportions indicated in Table I. Subsequently, the compositions are rendered basic by the addition of sodium hydroxide, An antifoam agent is used which can be a low foaming polyoxyethylene adduct of a polyoxypropylene hydrophobic base having a molecular weight of about 1750 wherein the oxyethylene content is about 10 weight percent of the molecule such as is sold under the trademark PLURONIC® L-61.

TABLE I

| Ingredients | Example 1 (control) | Example 3 |
|---|---|---|
| Ethylene glycol | 91.8 | 90.0 |
| Diethylene glycol | 4.8 | 5.0 |
| Water | 1.75 | 0.9 |
| Borax ($Na_2B_4O_7.5\ H_2O$) | 1.00 | 1.0 |
| $Na_3PO_4.12\ H_2O$ | 0.45 | — |
| $NaNO_3$ | 0.20 | 0.3 |
| $NaNO_2$ | — | 0.2 |
| Sodium metasilicate pentahydrate | 0.15 | 0.3 |
| Methyltriethoxysilane | — | 0.1 |
| Sodium benzoate | | 3.0 |
| Sodium mercaptobenzothiazole (50 percent active in water) | 0.55 | — |
| Tolytriazole (50 percent active in water) | — | 0.2 |
| NaOH | 0.20 | — |
| PLURONIC® L-61 | 0.05 | 0.03 |

TABLE II

ASTM D-1384 Glassware Corrosion Test
(loss in weight in mg.)

| Metal | Example 1 (control) | Example 3 (control) |
|---|---|---|
| Copper | 10 | 5 |
| 2004 solder | 175 | 14 |
| Brass | 7 | 6 |
| Steel | 1 | 1 |
| Cast iron | 01 | 4 |
| Aluminum | 4 | 2 |

TABLE III

ASTM D-2966 Ultrasonic Cavitation - Erosion Corrosion Test
(24 hours)

| Test Rating | Example 1 (contol) | Example 3 (control) |
|---|---|---|
| (Maximum rating = 10) | 3.4 | 10. |

While this invention has been described with reference to certain specific embodiments, it will be recognized by those skilled in this art that many variations are possible without departing from the scope and spirit of the invention and that it will be understood that it is intended to cover all changes and modifications of the invention disclosed herein for the purposes of illustration which do not constitute departure from the spirit and scope of the invention.

The embodiments of the invention in which an exclusive privilege or property is claimed are defined as follows:

1. A composition for inhibiting mineral scale and the corrosion of metals in the presence of an aqueous liquid and particularly the corrosion of high lead solder and the cavitation-erosion corrosion of aluminum, comprising:

A. an effective metal corrosion inhibiting amount of a siloxane-silicate copolymer containing about 0.1 to about 99.9 parts by weight, per 100 parts by weight of said copolymer, of (a) at least one siloxane group represented by the formula:

$$RSiO_{1.5}$$

wherein R is selected from the group consisting of a monovalent aliphatic hydrocarbon having 1 to about 18 carbon atoms, a phenyl group, and a vinyl group and 0.1 to 99.9 parts by weight, per 100 parts by weight of said copolymer, of (b) at least one silicate group represented by the formula:

$$\left[\frac{M}{d}O\right]_e SiO_{\frac{4-e}{2}}$$

wherein M is a cation which forms a water-soluble silicate, d is the valence of the cation represented by M and has a value of at least 1 and e has a value of 1 to 3 and B. an effective metal corrosion inhibiting amount of an azole.

2. The composition of claim 1 additionally comprising an effective corrosion inhibiting amount of a water-soluble metal salt nitrate and a pH buffering compound capable of providing a pH of about 8 to about 11 in the presence of said aqueous liquid.

3. The composition of claim 2 wherein said siloxane is selected from the group consisting of methyl, ethyl, and phenyl siloxane, said aqueous liquid comprises water, a water-soluble alcohol, or a water-miscible organic liquid; and said azole is selected from the group consisting of at least one of an alkali metal mercaptobenzothiazole and an alkali metal tolyltriazole.

4. The composition of claim 3 wherein said copolymer is a copolymer of methyl siloxane and an alkali metal silicate.

5. The composition of claim 4 wherein said composition additionally comprises a pH buffer compound selected from the group consisting of alkali metal benzoate, alkali metal hydroxybenzoates, alkali metal phosphates, and alkali metal carbonates.

6. A corrosion inhibiting alcohol-based antifreeze concentrate adapted to inhibit the corrosion of metals in contact with aqueous liquids, includingy cavitation-erosion corrosion of aluminum and the corrosion of high lead solder, comprising a water-soluble alcohol, a metal corrosion inhibiting amount of the siloxane-silicate copolymer of claim 1, and an azole.

7. The concentrate of claim 6 wherein said concentrate additionally comprises a water-soluble metal salt nitrate, a pH buffering compound capable of maintaining the pH of said alcohol-based antifreeze in the range of about 8 to about 11 and wherein said water-soluble alcohol has 1 to 4 carbon atoms and 1 to 3 hydroxy groups.

8. The concentrate of claim 7 wherein said azole is selected from at least one of the group consisting of an alkali metal mercaptobenzoate and an alkali metal tolyltriazole and said alcohol is ethylene glycol.

9. The concentrate of claim 8 wherein said pH buffer is selected from at least one of the group consisting of alkali metal benzoate, alkali metal hydroxybenzoates, alkali metal phosphates, and alkali metal carbonates, and wherein said siloxane silicate copolymer is the reaction product of methyl siloxane and an alkali metal silicate.

10. A corrosion-resistant aqueous liquid useful for inhibiting the corrosion of high lead solder in contact with aqueous compositions and for inhibiting the cavitation-erosion corrosion of aluminum in contact with aqueous liquids comprising an aqueous liquids and a minor but effective metal corrosion inhibiting amount, sufficient to inhibit the corrosion of high lead solder and the cavitation-erosion corrosion of aluminum in contact with aqueous liquids, comprising a mixture of water, the siloxane-silicate copolymer of claim 1, an azole selected from at least one of the group consisting of an alkali metal mercaptobenzothiazole, and an alkali metal tolyltriazole.

11. The compositin of claim 10 wherein said alkai metal mercaptobenzothiazole is sodium mercaptobenzothiazole which is present in the proportion of at least about 0.05 percent by weight of said aqueous liquid and said aqueous liquid comprises ethylene glycol.

12. The composition of claim 11 additionally comprising a water-soluble metal salt nitrate and a buffer compound capable of maintaining the pH of said ethylene glycol at about 8 to about 11.

13. The composition of claim 12 wherein said siloxane-silicate copolymer is the reaction product of methyl siloxane and an alkali metal silicate.

14. In a process for inhibiting the corrosion of high lead solder and the cavitation-erosion corrosion of aluminum in contact with an aqueous liquid, the improvement wherein said aqueous liquid comprises a water-miscible glycol, a minor but effective metal corrosion inhibiting amount of the siloxane-silicate copolymer of claim 1, and an azole.

15. The process of claim 14 wherein said water-miscible glycol has 1 to about 4 carbon atoms and 1 to about 3 hydroxy groups and said siloxane-silicate copolymer is the reaction product of methyl siloxane and an alkali metal silicate.

16. The process of claim 15 wherein said azole is selected from the group consisting of at least one of an alkali metal mercaptobenzothiazole and an alkali metal tolyltriazole.

17. The process of claim 16 wherein said aqueous liquid additionally comprises a water-soluble metal salt nitrate and a pH buffer compound capable of maintaining the pH of said aqueous liquid at about 8 to about 11.

* * * * *